United States Patent [19]

Shinal

[11] Patent Number: 5,683,038
[45] Date of Patent: Nov. 4, 1997

[54] TIRE DISSECTION SYSTEM

[76] Inventor: Thomas J. Shinal, Cottage Grove La., Waterford, Va. 22190

[21] Appl. No.: 568,139

[22] Filed: Dec. 6, 1995

[51] Int. Cl.⁶ ............................ B02C 19/00; B02C 19/12
[52] U.S. Cl. ............... 241/1; 241/24.13; 241/24.17; 241/41; 241/DIG. 31
[58] Field of Search ..................... 241/1, 5, 23, 41, 241/65, DIG. 31, 21, 24.13, 24.17

[56] References Cited

U.S. PATENT DOCUMENTS

| | | | |
|---|---|---|---|
| 1,963,943 | 6/1934 | Gross | 241/DIG. 31 X |
| 4,081,143 | 3/1978 | Johnson et al. | 241/29 |
| 4,090,670 | 5/1978 | Bennett | 241/23 |
| 4,889,556 | 12/1989 | Dighe | 75/10.22 |
| 5,115,983 | 5/1992 | Rutherford, Sr. | 241/1 |
| 5,236,352 | 8/1993 | Carpenter | 432/13 |
| 5,299,744 | 4/1994 | Garmater | 241/19 |
| 5,385,307 | 1/1995 | Azar | 241/41 |
| 5,482,215 | 1/1996 | Veres | 241/1 |

FOREIGN PATENT DOCUMENTS

2607945  9/1977  Germany ............... 241/DIG. 31

*Primary Examiner*—John M. Husar
*Attorney, Agent, or Firm*—Pennie & Edmonds LLP

[57] ABSTRACT

A tire dissection method and apparatus to separate the rubber and steel components in a tire by using a high pressure fluid. The high pressure fluid removes the rubber liner and excises the steel bead bundle in a tire. The steel components in the tire may be stressed to move away from the rubber components prior to application of the high pressure fluid. The process yields four distinct products from a vehicle tire: crumb rubber, chunk rubber, high tensile steel, and plated steel. The process is easy to use, reliable, and portable. The rubber liner can be softened prior to processing by the high pressure fluid to improve the efficiency of the process.

16 Claims, 10 Drawing Sheets

TIRE DISSECTION SYSTEM

BACKGROUND OF THE INVENTION

This invention relates to vehicle tire reclamation systems. More particularly, it relates to a method and apparatus for separating a tire into its basic components for recovery and/or recycling.

Billions of discarded tires are strewn throughout the United States. Each year, 240 million more are added to their numbers. Discarded tires can be found in tire dumps, backyards, abandoned lots and a host of other sites. Some tire accumulations reach into the millions. These tires provide a habitat for insects and other vermin which, in turn, spread disease. They are also a source of pollution and present a significant fire hazard. The problems associated with tire disposal are not unique to the United States. Europe and the rest of the world must also cope with countless millions of used tires.

Tires are designed to be bulky, resilient and largely indestructible. They are also non-biodegradable. Traditional approaches to disposing of garbage are not always suitable for tire disposal. Burying tires, for instance, is not a viable solution because tires tend to work their way back to the surface. Moreover, burial does not allow one to reclaim the materials found in a tire. Incinerating tires is not a good solution either. Although tires start to melt at relatively low temperatures (less than 180° F.), they release noxious fumes and generate large amounts of flowing oil when burned at temperatures below 1600° F.

Tires are primarily composed of polyester fabric, lamp black, steel, rubber and oil-based polymers. Henceforth, the last two of these shall simply be referred to as rubber. In a twenty pound automobile tire, there is a combined total of about four pounds of polyester fabric and lamp black, four pounds of steel and twelve pounds of rubber. The four pounds of steel is distributed between high tensile steel, found in the bead area of a tire to help grip the wheel, and one or more layers of brass plated steel wires which provide a steel belt in the tread area of the tire.

In addition to the obvious environmental advantages, there are also economic advantages to dissecting a tire into its components for recycling. The rubber in a single tire has the energy equivalent of 180,000 BTU, about the same as two gallons of oil. Thus, the rubber can be recycled for its energy content. Tire rubber may also be used as an ingredient in asphalt compositions for highways and in other products as well.

For recycling purposes, ideally, the tire rubber must be completely free of pieces of steel. Steel-free tire rubber, for instance, makes an ideal fuel for both hog fuel and fluidized-bed furnaces found in power plants and co-generation plants. Chunks of steel-free tire derived fuel (TDF) burns at 1600° F. with the same emissions and at the same energy as oil. Since power plants typically operate at a temperature of 3000° F., this type of fuel can be burned with almost a 100% temperature margin. In contrast, steel-laden tire rubber exhibits a lower burn temperature and emits high concentrations of nitrous oxides, sulphur dioxides, and other contaminants. This kind of rubber also leaves behind residues which clog furnace grates.

Recycled tire rubber used to manufacture products must also be steel-free. This makes it easier for both machines and humans to work with recycled rubber. As long as tires retain the least amount of steel wire, they cannot be used in products which come in contact with humans due to the possibility of injury from the sharp edges of the steel wires.

Common tire dissection and reclamation techniques consist of shredding tires using rotary cutters (see U.S. Pat. No. 4,081,143), grinders or granulators (see U.S. Pat. No. 5,299,744). These machines are unusually large and expensive and have a low mean time between failures. While these methods reduce the tire rubber to manageable fragments, pieces of steel are invariably mixed in. The steel must still be separated out by additional equipment such as a magnetic separator (see U.S. Pat. No. 5,299,744). In addition, the maintenance costs associated with this machinery is quite large.

Another approach for dissecting and reclaiming steel belted tires involves pyrolitic reduction of tires into their chemical components using a plasma fired cupola (see U.S. Pat. Nos. 4,889,556 and 5,236,352). Pyrolysis and similar gasification techniques are not well-proven technologies. They are also very expensive and require fixed sites for operation.

Cement kilns have also been employed in the past. And although the inclusion of whole tires into a cement kiln is a proven technology, the throughput is very low. The consumption rate of used tires in cement kilns is very low, on the order of 120 tires per hour.

Tire carcasses can also be reclaimed by immersing whole tires into a liquid nitrogen tank to render them brittle followed by mechanical fracturing of the tire rubber (see U.S. Pat. No. 5,385,307). The steel, however, must still be separated out.

Each of the above techniques requires a large investment in equipment situated at a fixed site. This means that the tires must be transported to the processing plants, adding to the already high operating expenses.

The tire dissection/reclamation industry requires a simple, portable, and inexpensive method for recycling tires. The method must provide clean and reusable steel and must also produce a clean rubber product which can be utilized without further processing. Ideally, the rubber product should be suitable for use as an alternate energy source, such as tire derived fuel, as a crumb rubber modifier for highway asphalt, or some other consumer/industrial applications.

SUMMARY OF THE INVENTION

It is an object of this invention to provide a new and improved tire dissection apparatus and process which is easy to use, reliable, and portable.

It is a further object of this invention to provide a system and process which yields four distinct products from a vehicle tire, namely, steel-free chunk rubber, steel-free crumb rubber, clean high tensile steel, and clean plated steel.

It is a still further object of this invention to provide steel-free pieces of chunk rubber of variable size depending upon the application.

It is a still further object of this invention to provide steel-free, crumb rubber of variable mesh size depending upon the application.

It is still a further object of this invention to provide a method which will process tires at a rate of 1,000 per hour or more per station.

This invention describes a tire dissection process to separate the steel components from the rubber components in a tire by applying a high pressure fluid to the rubber components in areas where the steel components are embedded thereby separating out the rubber and steel constituents in a tire. In addition, the tire may be stressed to move the steel components away from the rubber components prior to applying the high pressure fluid. This process separates out the tire rubber from the steel in chunk or crumb form and renders it suitable for recycling. To improve the efficiency of this process, the rubber liner in the tire may be softened prior to application of the high pressure fluid.

DETAILED DESCRIPTION OF THE INVENTION

Figure 1:
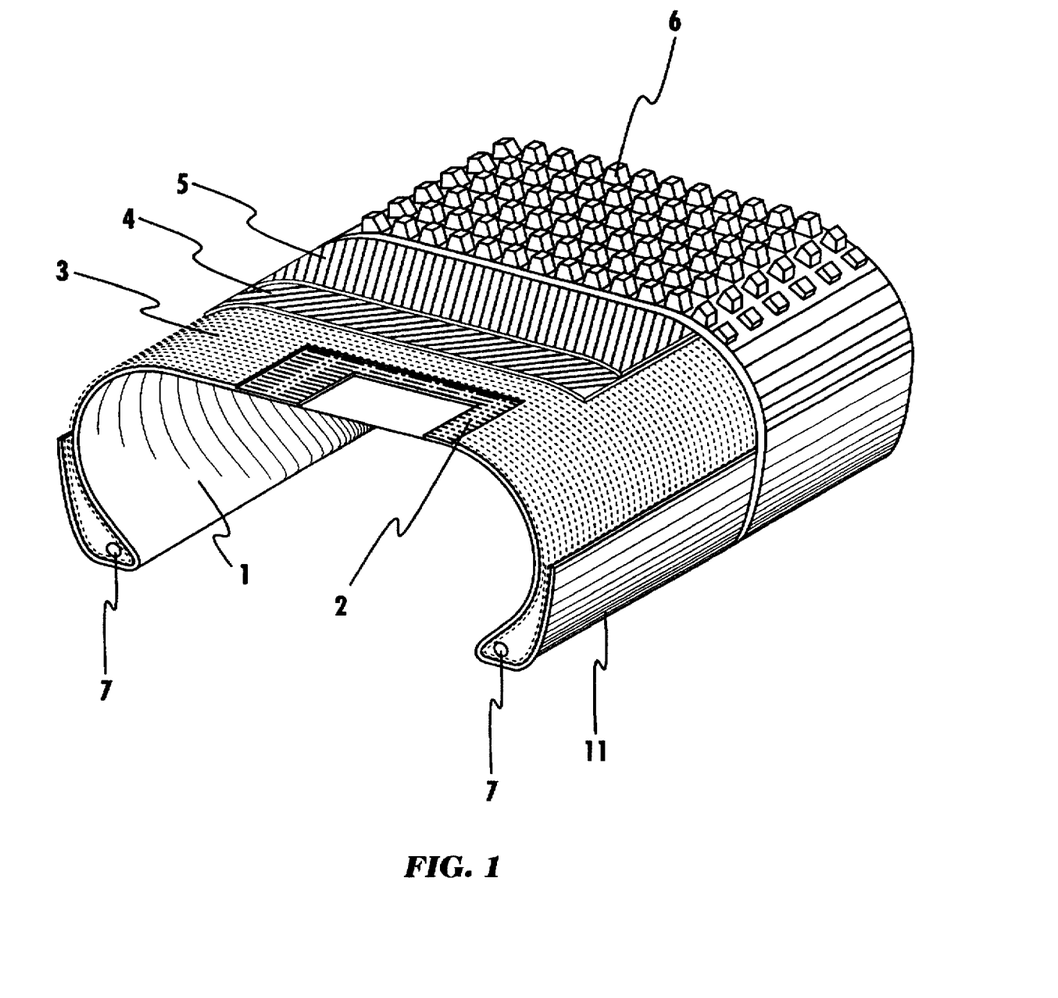
FIG. 1 is a schematic cross-section of a vehicle tire.

FIG. 1 shows a schematic cross-section of a vehicle tire. A tire is a multi-layered structure comprising layers of rubber, polyester and steel. The inner liner 1 forms the inside of the tire and is a relatively thin layer of polymer or rubber. Adjacent to this liner 1 are one or two layers of polyester woven fabric 2, 3. The layers of polyester woven fabric 2, 3 buffer the steel layer 4 from the inner liner 1. The steel layer, often called a belt is embedded in the rubber components of the tire and comprises a number of parallel, brass plated steel wires running tangential to the tread of the tire. Them is often a second layer of plated steel wires 5 which is disposed at an angle relative to the first steel layer 4. The final layer of the tire is the rubber tread area 6 which typically has a thickness of ⅛ inch to one inch or more.

Embedded within the edge of the sidewall 11 of a tire is a steel bead bundle 7. Typically, the bead bundle 7 comprises a bundle of high tensile steel wires. It may also be a single wire or strip of steel or other metal. The bead bundle 7, which is typically about ¼ inch in diameter, forms a reinforced area by which the tire grips the steel rim of the wheel and holds the tire in place.

Figure 2:
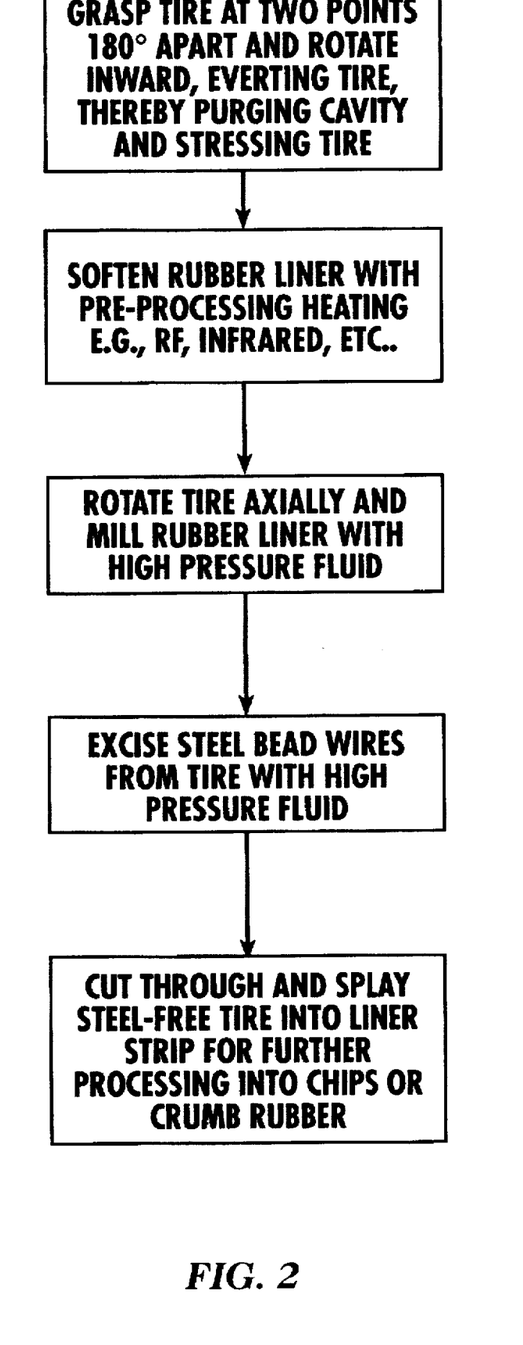
FIG. 2 is a flow chart showing the eversion tire dissection process of the present invention.
Figure 3A:
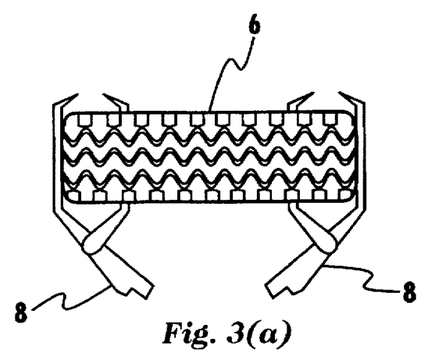
FIGS. 3(a)–(e) show a tire being everted using a pair of pincers.
Figure 3B:
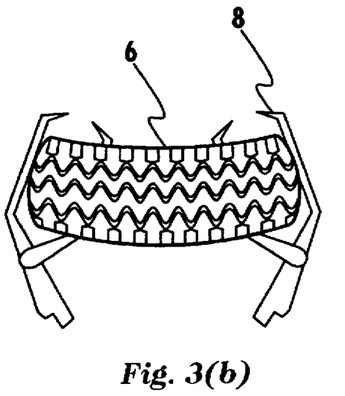
Figure 3C:
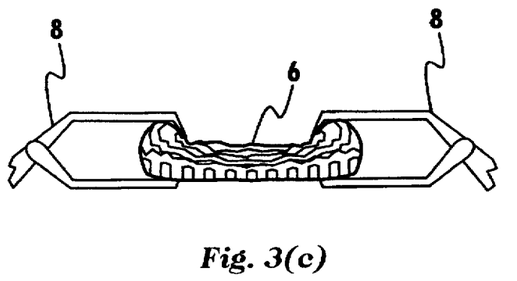
Figure 3D:
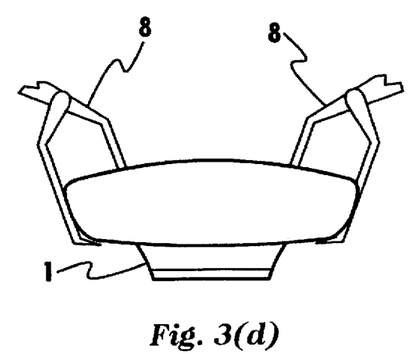
Figure 3E:
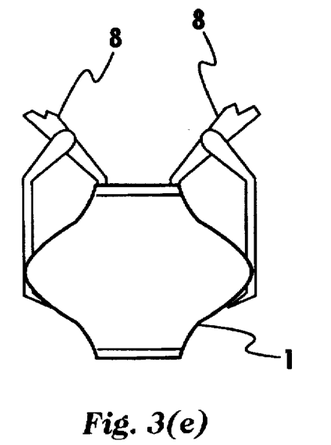

FIG. 2 shows a flow chart of the eversion tire dissection process of the present invention. At the outset, the tire is everted (i.e., turned inside out). FIGS. 3(a)–(e) shows how a tire can be everted. Eversion may be accomplished mechanically through a pincer action wherein two pincers grasp the tire from diametrically opposite sides and rotate the sidewalls inwards toward each other, thereby effecting the eversion of the tire. At the start of the eversion process, two pincers 8 grasp the tire at two points 180° apart and commence inward rotation (see FIG. 3(a)). As the pincers 8 rotate the tire inwards, the shape of the tire is distorted (see FIGS. 3(b)&(c)). As the eversion is completed, the rubber tread area 6 is now on the inside and the rubber liner 1 is on the outside (see FIG. 4). When eversion is complete, the tire bulges in the middle (see FIG. 3(e)) since the larger mass of the tread area 6, which is compressed on the inside, exerts pressure on the rubber liner 1 which is on the outside.

Figure 4:
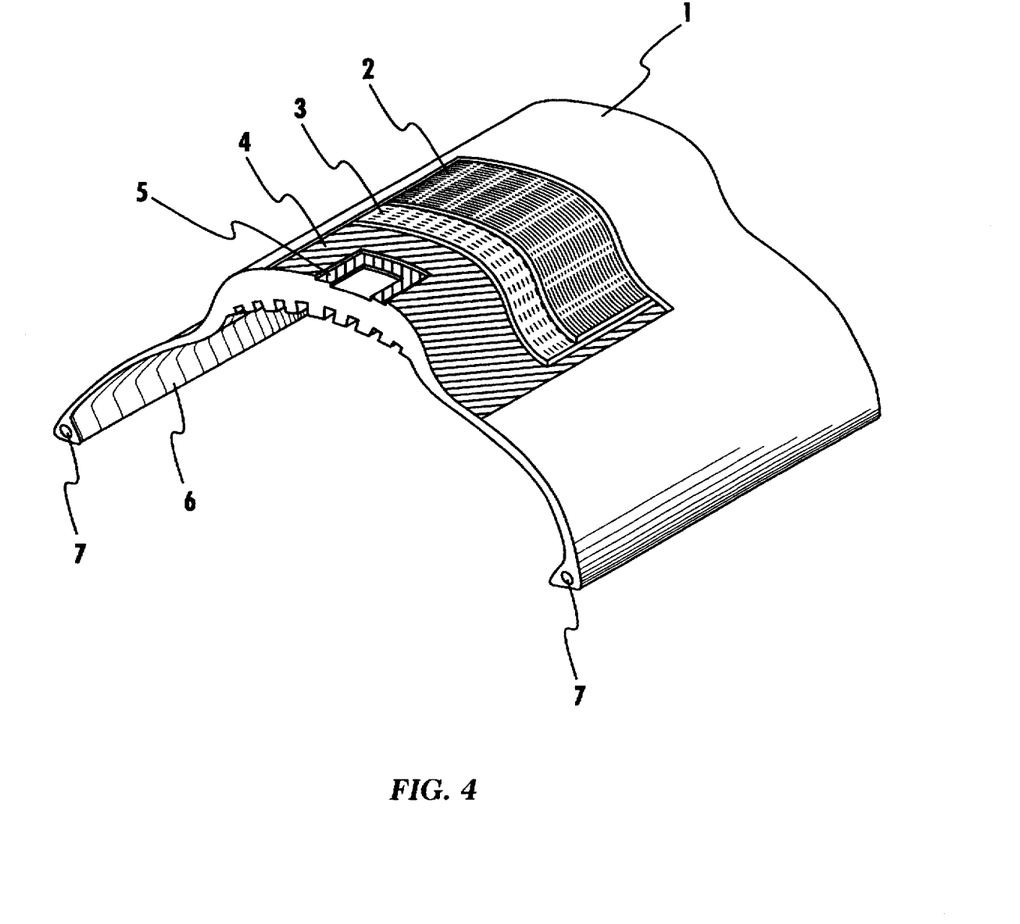
FIG. 4 is a schematic cross-section of an everted tire.

Everting a tire purges it of all loose and compacted debris in the tire cavity. Eversion also stresses the tire in a fashion which is opposite to the manufacturer's design. The everted tire exerts extreme pressure upon the rubber liner 1 and the steel layers 4, 5. In the everted tire, the steel layers 4, 5 are under extreme stress due to both the unnatural state of the tire as well as the unnatural state of the steel layers, themselves. Although they are still held in place by the inner liner 1, they are strongly biased in a direction urging them through the inner liner and out of their embedment in the rubber components of the tire.

Figure 5:
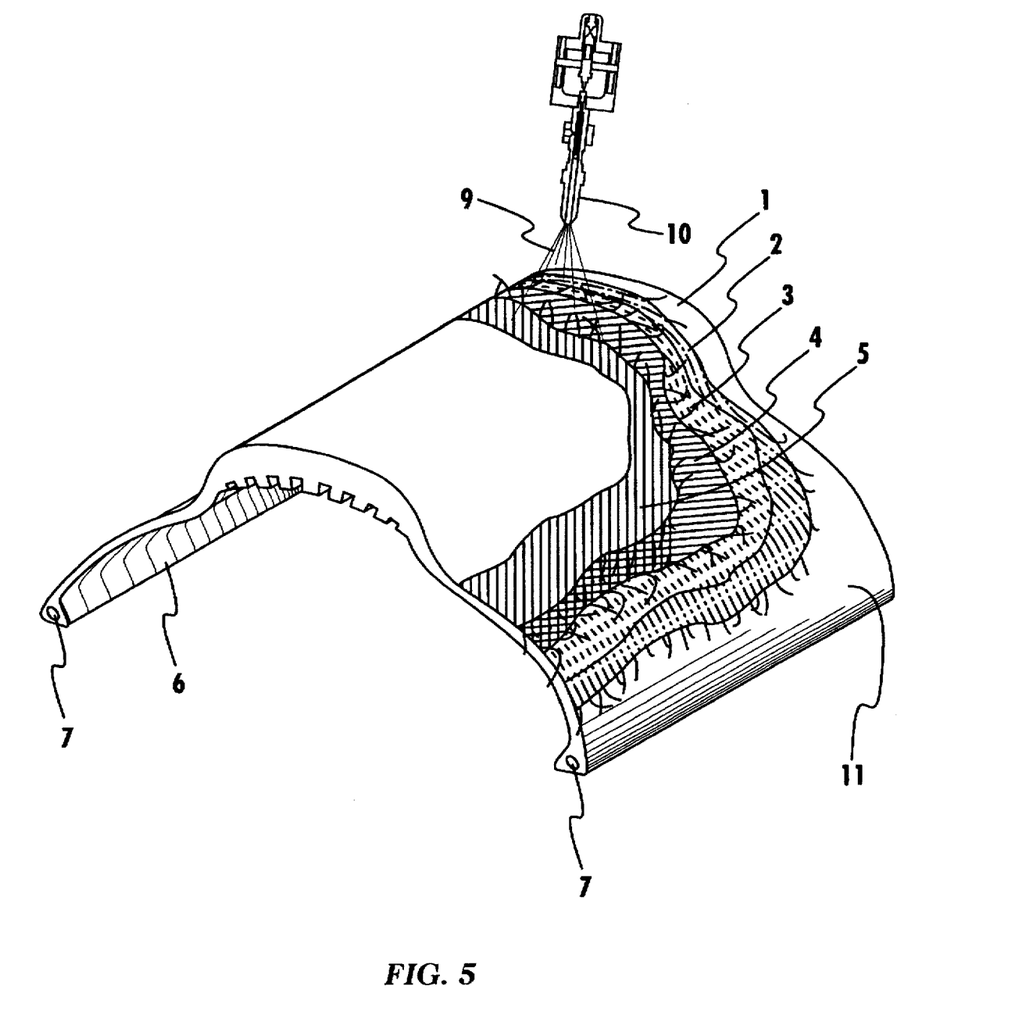
FIG. 5 shows the rubber liner, the polyester layers and the steel wire layers of an everted tire being removed by the high pressure fluid being ejected by a nozzle.

Next, the rubber liner 1 on the outside of the tire is weakened by applying a high pressure fluid (see FIG. 5). A jet of high pressure fluid 9 is produced by multi-head, rotating or fan-jet nozzles 10. The fluid 9 is directed from the nozzles through circular or rectangular openings having typical dimensions of 8–12 mils. The fluid 9 exits the nozzles at supersonic speeds, as high as Mach 3, and at pressures up to 100,000 psi. This high pressure fluid separates the rubber liner 1 from the tire by milling it. The high pressure fluid also cuts through the rubber around the steel of the layers 4, 5 at a rate of more than 250 inches per minute. Rōtating 4-port or 5-port nozzles or fan jet nozzles manufactured by Flow Jet International may be suitably employed to generate a jet of supersonic fluid. In the preferred embodiment, water is the fluid used and it is directed at the rubber liner at a pressure of 50,000–55,000 psi from a multiple-head, rotating nozzle. During the milling and cutting operation, the tire and the fluid nozzle are moved relative to one another to ensure that the entire surface of the rubber liner is milled. As the rubber liner 1 is acted upon by the fluid, the liner 1 is reduced to crumbs, which are mixed in with the fluid, creating a slurry. The slurry may then be recaptured for subsequent separation.

As the liner 1, and the polyester layers 2, 3 are blasted away by the fluid, the fluid continues to penetrate the rubber between the steel wires 4, 5. When the inner liner and polyester are no longer part of the tire, the internal pressure of the everted tire will force the steel wires 4, 5 from the surrounding rubber. The steel wires are further aided in their release from the tire by the high pressure fluid which dislodges the wires from the rite. At this point, the steel wires are clean and separated from the rubber and ready for recycling applications. In a preferred embodiment, based on the recycling requirements, the rubber and polyester can be separated out using centrifugal separators. These centrifugal separators are currently employed in the tire recycling industry and are well known to practitioners in the art. For most applications using recycled crumb rubber from tires, the polyester forms part of the crumb and does not need to be separated out.

Figure 6:
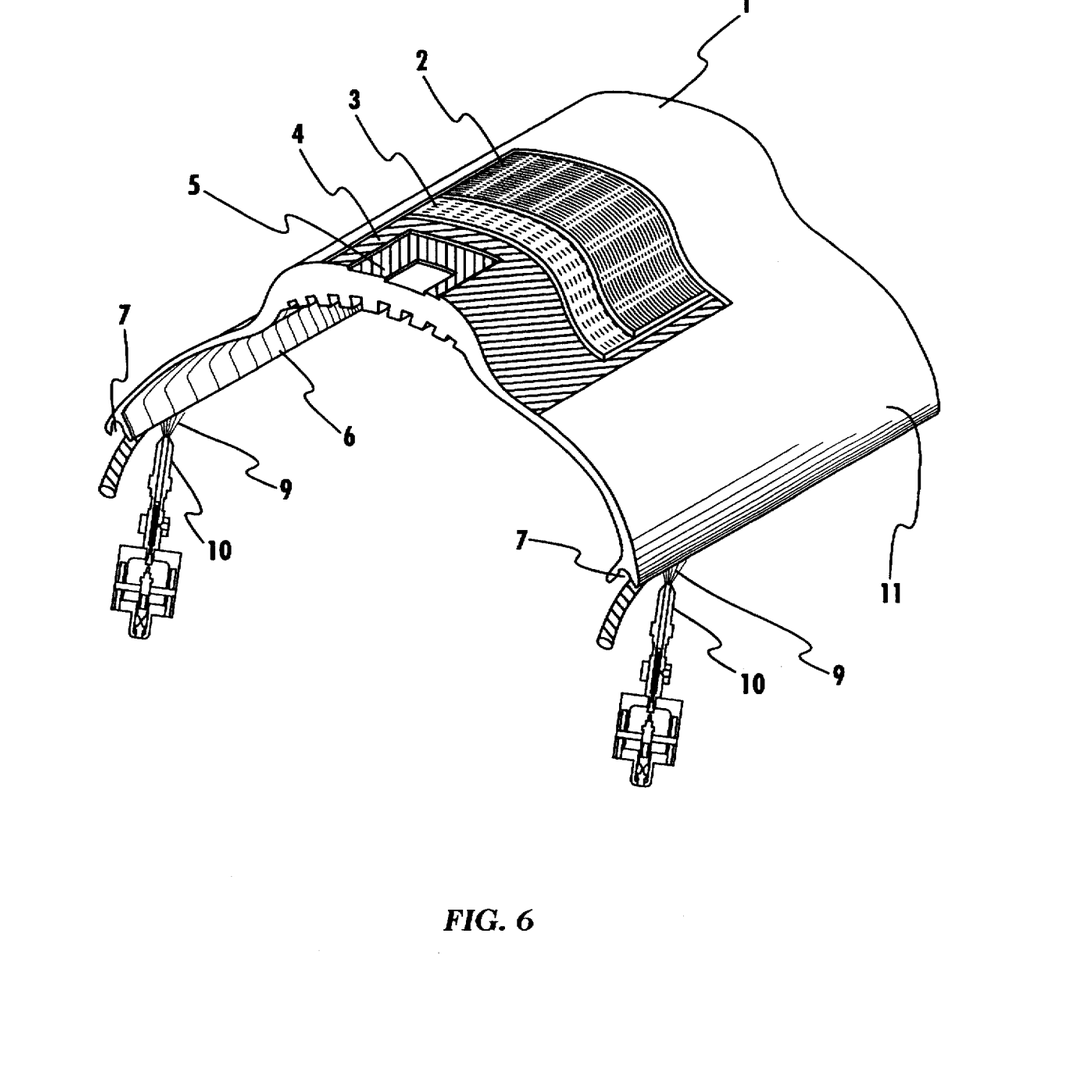
FIG. 6 shows the steel bead bundle in a tire being excised by a stream of high pressure fluid.

Next, the steel bead bundle 7 is excised from the tire. This may be accomplished by standard mechanical means such as cutting away the steel bead bundle area. In the alternative, the steel bead bundle 7 may also be removed using the jet of high pressure fluid 9 as shown in FIG. 6. The tire is passed to a station provided with magnetic proximity sensors to detect the presence and location of the steel bead bundle 7. Magnetic proximity sensors are well known in the art and widely available. Once the bead wire is detected, a stream of high pressure fluid is employed to slice the bead region 7 from the sidewalls 11 of the tire. Finally, the steel-free annular tire is transformed into a linear strip for further processing by cutting through the tire.

The process described above removes all the steel from a tire leaving behind a clean, steel-free, rubber carcass. This rubber carcass can be processed into two forms: (a) the rubber can be cut by the high pressure fluid into square chunks approximately 1–2 inches in size or (b) the rubber can be milled into crumbs of a desired size, say between 10–200 mesh (i.e., between 1/10th to 1/200th of an inch).

Figure 7:
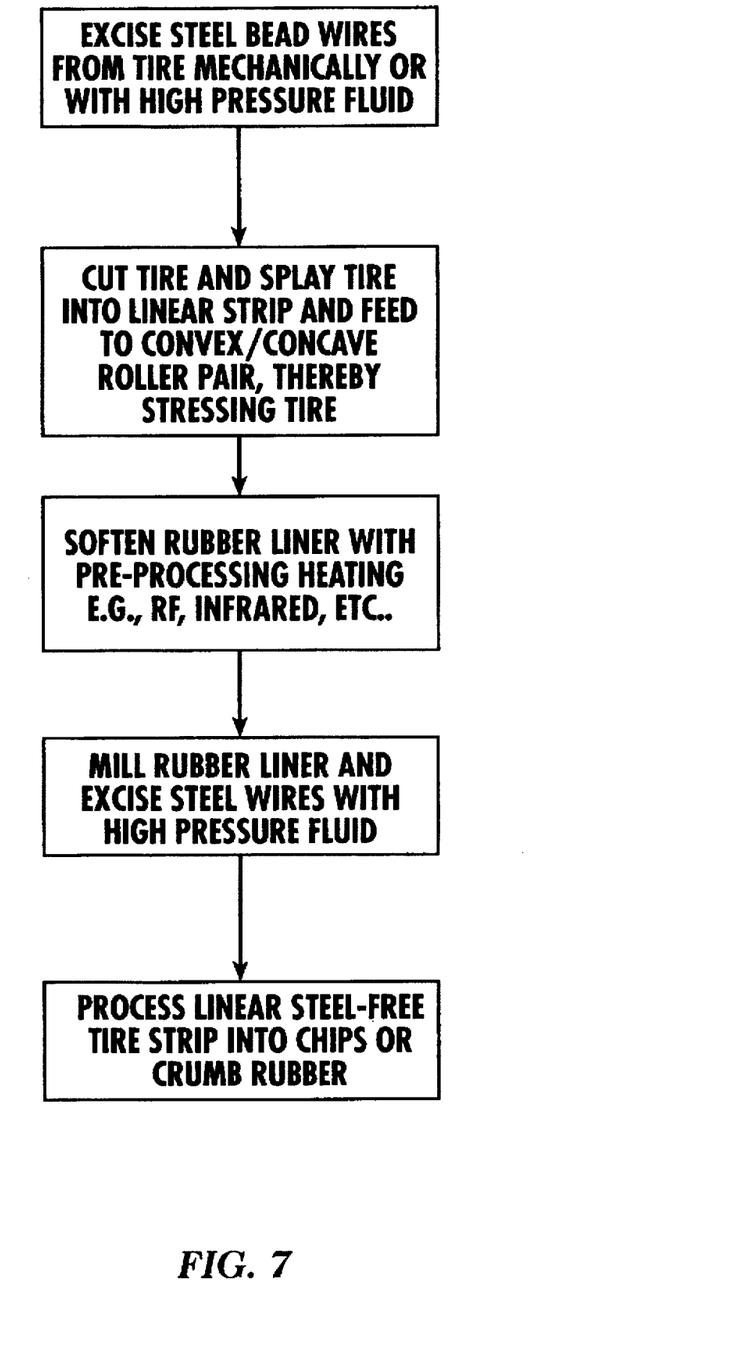
FIG. 7 is a flow chart showing the linear tire dissection process of the present invention.
Figure 8:
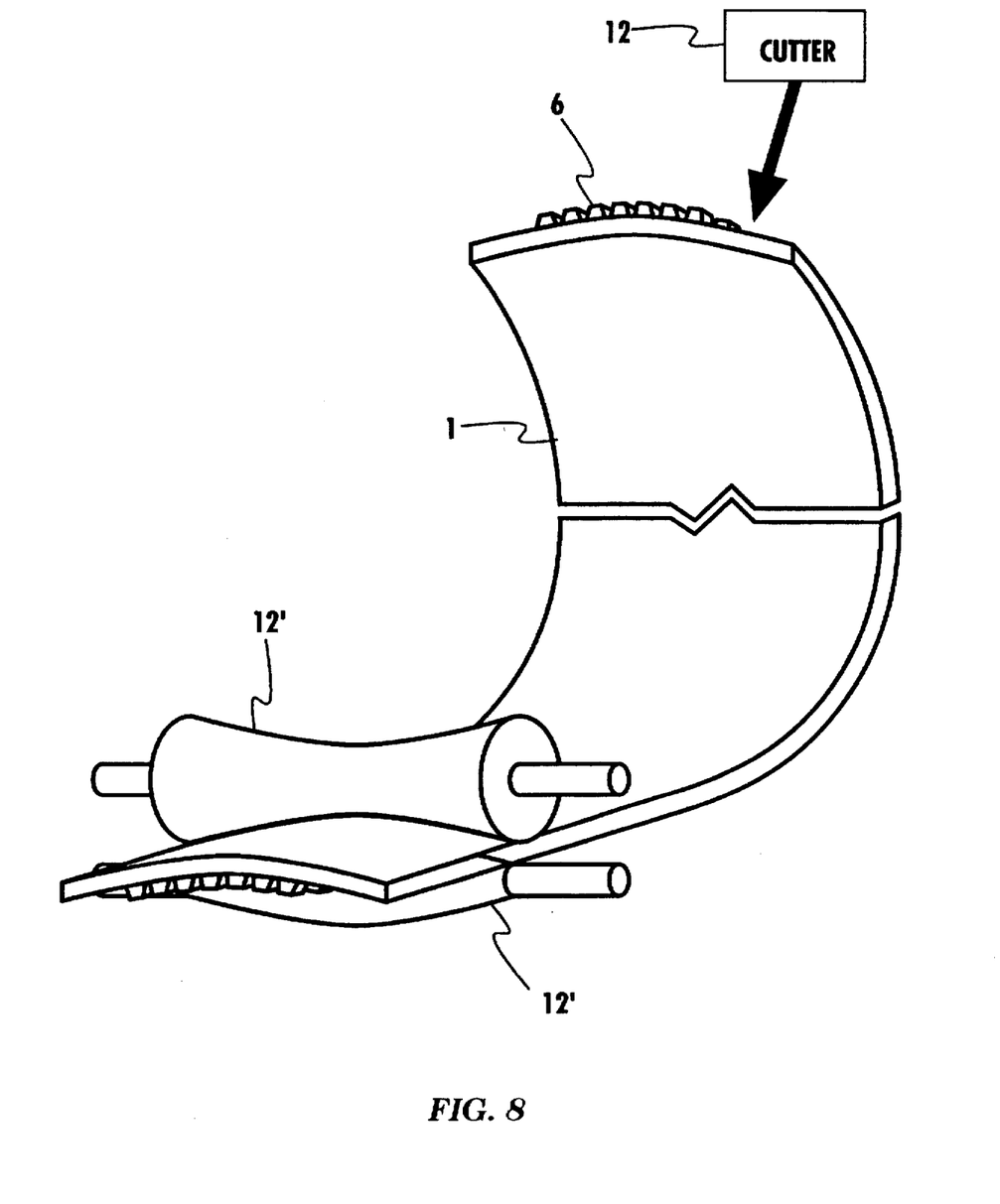
FIG. 8 shows a linear strip of tire being passed through a concave/convex roller.

In a second embodiment, the tire can be separated out into its rubber and steel components using a linear tire dissection process (see FIG. 7). In the linear process the tire is not everted. At the start of the process, the steel bead bundle 7 is excised from the tire using standard mechanical means or by using a high pressure fluid jet in a manner as shown in FIG. 6. After excising the steel bead bundle 7, the annular tire is cut into a linear length by any conventional means shown in FIG. 8 at 12 and then fed into a concave/convex roller pair 12' which stresses the tire in the opposite direction to its manufactured form (see FIG. 8). Passing the tire through the roller exerts extreme pressure upon the rubber liner 1 and the steel layers 4, 5. The steel layers 4, 5 are under extreme stress due to both the unnatural state of the tire as well as the unnatural state of the steel layers, themselves. Although they are still held in place by the inner liner 1, they are strongly biased in a direction urging them through the inner liner and out of their embedment in the rubber components of the tire. This process splays the tire into a linear strip and prepares it for s subsequent processing. Next, a jet of high pressure fluid is employed to remove the rubber liner 1 from the tire. During this milling operation, the tire and the fluid nozzle are moved relative to one another to ensure that the entire surface of the rubber liner is milled. As in the eversion process, when the rubber liner 1 is acted upon by the fluid, the liner is weakened and eventually reduced to crumbs, which are mixed in with the fluid, creating a slurry. The slurry may then be recaptured for subsequent separation. When the inner liner and polyester are no longer part of the tire, the internal pressure of the stressed tire will force the steel wires 4, 5 from the surrounding rubber. At this point, the steel wires are clean and separated from the rubber and ready for recycling applications. In a preferred embodiment, based on recycling requirements, the rubber and polyester can be separated out using centrifugal separators. For most applications using recycled crumb rubber from tires, the polyester forms pan of the crumb and does not need to be separated out.

Figure 9:
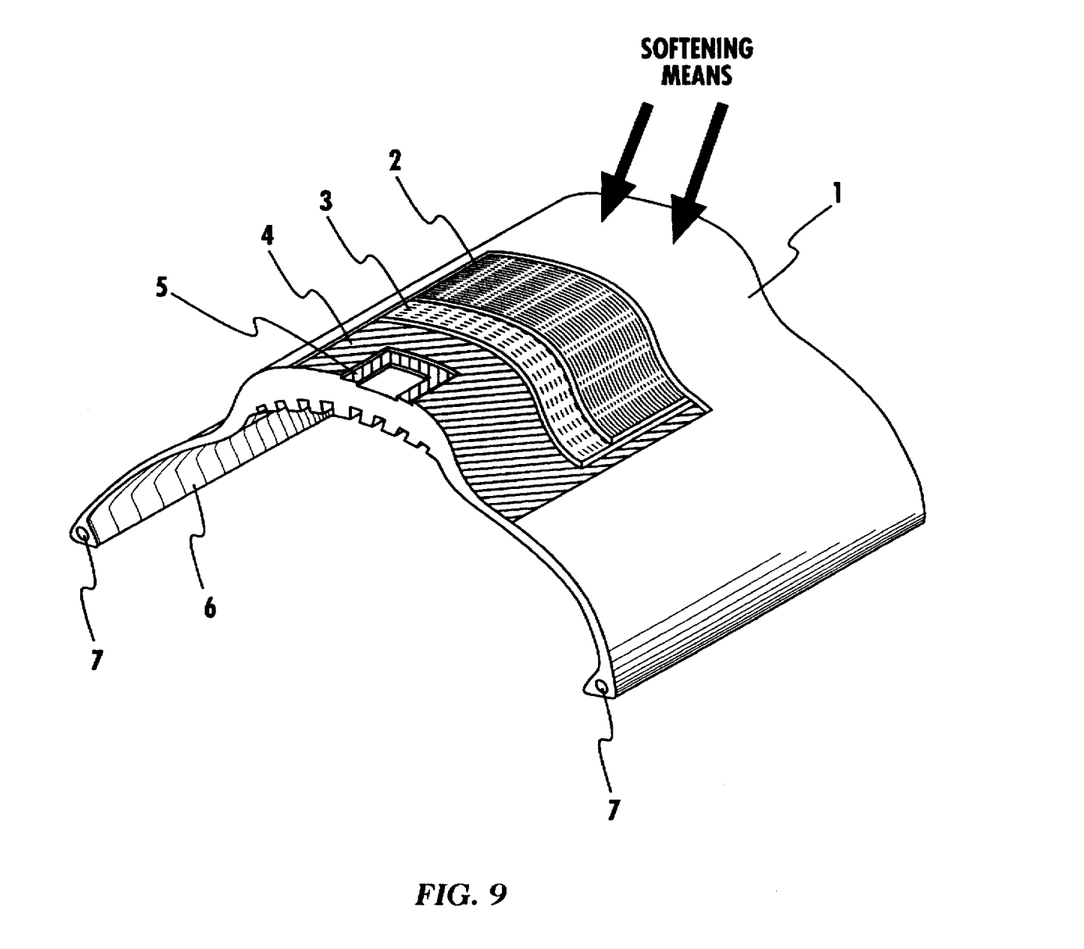
FIG. 9 is a schematic representation of the rubber liner in a tire being softened using a softening means.

In both the eversion and linear processes, the rubber liner 1 may be pre-softened using appropriate softening means prior to application of the high pressure fluid (see FIG. 9). Softening the rubber liner 1 before applying the high pressure fluid to mill the liner makes the overall process more economically efficient. When the rubber liner of a stressed tire is softened, the steel belts start to flex even more in an attempt to break free from the embedment in the tire. Thus, softening the rubber liner permits the subsequent milling to be carried out at lower pressures and at higher speeds than otherwise possible. This allows for greater throughput of tires and higher product yield with the same equipment. Also, the softening can be continued until the integrity of the rubber components holding the steel components in place has weakened to the point where the steel wire components spring away from the tire, due to their stressed orientation. Thus, milling by a high pressure fluid may be dispensed with or reduced to a minimum.

Softening can be accomplished in a number of ways (see FIG. 10). FIG. 10(a) shows a cross section of an evened tire wherein the rubber liner is subject to electromagnetic energy. The tire is exposed to a magnetic field by placing an open core electromagnet 13 in close proximity to the tire. The open core electromagnet when placed close to the plated steel wires 4 forms a closed magnetic loop. The hysteresis of the magnet generates heat which will be conducted through the rubber. The rubber liner 1 which is normally thought of as being an insulator, is both thermally and electrically conductive due to a heavy concentration of carbon lamp black inherent to its composition. This electromagnetic heating softens the liner when it reaches the low temperature of 180° F. Once the liner 1 is softened, the steel starts to flex in an attempt to break free from the tire.

Figure 10A:
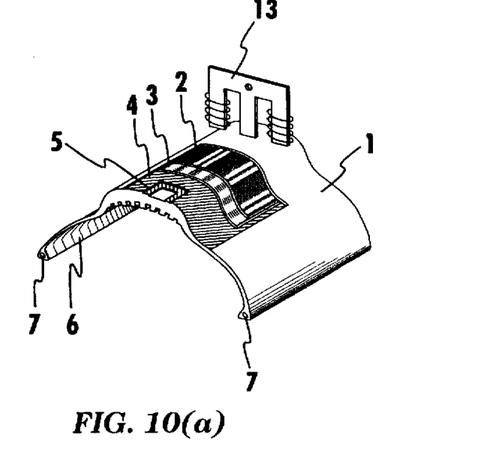
FIG. 10(a) is a cross-section of an everted tire being heated by electromagnetic energy from an electromagnet.
Figure 10B:
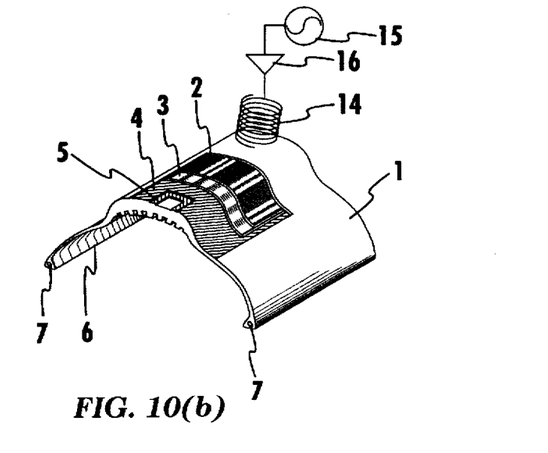
FIG. 10(b) is a cross section of an everted tire being heated by a high frequency RF source.

Alternatively, the rubber liner of a tire can be softened using electromagnetic energy at radio frequencies. FIG. 10(b) shows a cross section of an everted tire being acted upon by a high frequency energy transducer 14. The high frequency energy is generated by an oscillator 15, operating from medium frequencies to microwave frequencies, whose signal is then amplified by an power amplifier 16 driving the transducer. When the tire is exposed to a high frequency RF source, the steel plated wire 4 and the carbon impregnated, conductive rubber liner 1 acts as a loading circuit. Saturation of the carbon impregnated rubber heats the rubber liner 1. The steel wires 4 act as a shield to the rest of the tire and reflect the RF energy back into the liner 1.

Figure 10C:
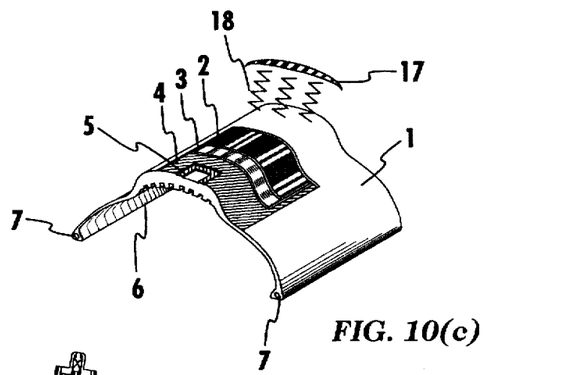
FIG. 10(c) is a cross section of an everted tire being heated by infrared energy.

The rubber liner can also be softened using infrared energy. FIG. 10(c) shows a cross section of an everted tire which is acted on by infrared energy. The tire is exposed to a high power infrared energy source 17 in such a manner that radiated heat 18 is presented to the rubber liner 1. The infrared energy is absorbed by the carbon-laden rubber liner 1. The steel wires 4 act as a reflector and contain the heat within the liner 1. This allows for more efficient utilization of the infrared energy and causes the rubber liner to soften.

Figure 10D:
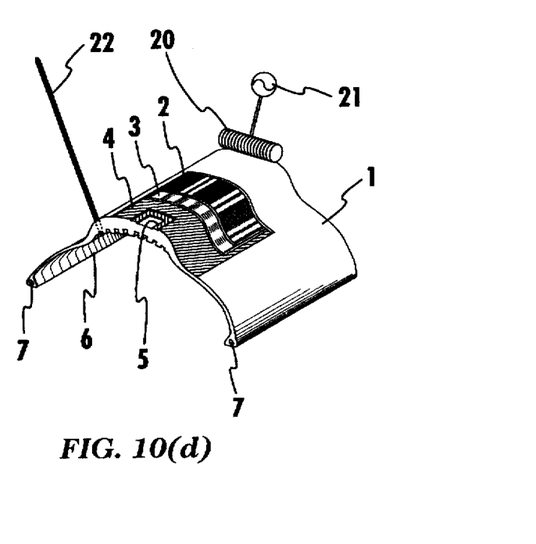
FIG. 10(d) is a cross section of an everted tire being heated by a high temperature, low pressure fluid.

In another option, the rubber liner can be softened using a high temperature, low pressure fluid, such as steam or super-heated steam. FIG. 10(d) shows a cross section of an everted tire being acted on by a high temperature, low pressure fluid 19. The fluid may be generated by using conventional practices, such as a flash-boiler, and the fluid 19 is then presented to the rubber liner 1 through a nozzle.

Figure 10E:
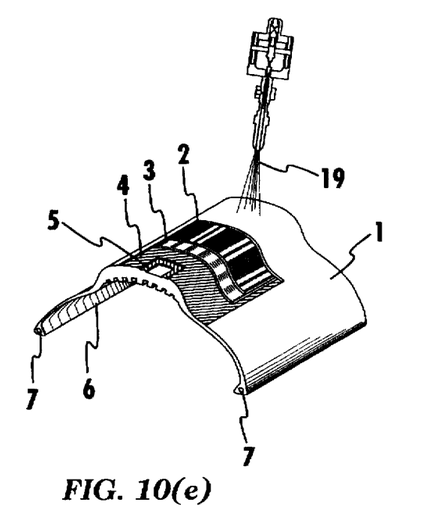
FIG. 10(e) is a cross section of an everted tire being heated by a high power electrical source.

The rubber liner can also be softened by using resistive (i.e., Ohmic) heating. FIG. 10(e) shows a cross section of an everted tire exposed to a high voltage source. A conductive plate 20 driven by an AC source 21, typically around 1000V, is placed in close, physical contact to the rubber liner 1. The circuit is completed by electrical probes 22 which are inserted into the steel wire mesh 4. Heat is generated by the current flowing through the resistance presented by the carbon impregnated rubber liner in accordance with Ohm's law. This heat softens the liner 1 and prepares it for subsequent processing.

The various methods of softening described above are, however, optional. Softening the rubber liner is not a prerequisite to subsequent milling by the high pressure fluid.

What is claimed is:

1. A method of separating steel components from rubber components in a tire, said steel components being embedded in said rubber components, said method comprising the steps of:

positioning at least part of the tire in an orientation which places said steel components under a stress which, in turn, biases said steel components against a portion of said rubber components and in a direction urging them out of their embedment in said rubber components, said portion of said rubber components in the manufactured state of said tire having a strength sufficient to retain said steel components in place in their embedment in said rubber components; and weakening the strength of said portion of said rubber components to a level permitting separating of said steel components from said rubber components under influence of said stress.

2. A method of separating steel components from rubber components in a tire, said steel components being embedded in said rubber components, said method comprising the steps of:

positioning at least a part of the tire in an orientation which places said steel components under a stress which, in turn, biases said steel components in a direction urging them out of their embedment in said rubber components; and applying a high pressure fluid to said rubber components in said part of the tire in areas where said steel components are embedded to remove said rubber components from said steel components.

3. A method of separating steel components from rubber components in a manufactured tire, said tire including an inner liner (1), an outer tread (6) and opposite sidewalls (11) terminating in annular edges for engaging a rim of a wheel, and said steel components including at least one steel wire belt layer (4, 5) embedded in said rubber components between said inner liner (1) and said thread (6) and a steel bead (7) embedded in said rubber components along the annular edge of each sidewall (11) said method comprising the steps of:

positioning at least a part of said tire in an orientation to place said wire belt liner (4, 5) under stress which, in turn, biases said wire belt layer (4, 5) against said inner liner and in a direction urging said wire belt layer (4, 5) out of embedment in said rubber components, said liner (1) in the manufactured state of said tire having a strength sufficient to retain said wire belt layer (4, 5), when under said stress, in place in said embedment in said rubber components; and applying a high pressure fluid to said liner (1) and said rubber components in which said wire belt layer (4, 5) is embedded to remove said liner (1) and said rubber components from said wire belt layer (4, 5) at least to an extent which permits said steel belt wire layer (4, 5) to separate from said rubber components under influence of said stress.

4. The method of claim 3 wherein:

said steel wire belt layer (4, 5) is stressed by everting said tire, with said steel components embedded in said rubber components.

5. The method of claim 4, further comprising the step of:

softening said liner (1) and rubber components in which said steel belt layer (4, 5) is embedded to cause weakening thereof, prior to applying said high pressure fluid.

6. The method of claim 4, further comprising the step of:

applying a high pressure fluid to said annular edge of each sidewall after separating said wire belt layer (4, 5) from said inner liner (1) and said rubber components, to remove said rubber components in which said steel bead (7) is embedded; and separating said steel bead (7) from said tire.

7. The method of claim 3 further comprising the steps of:

separating said steel bead (7) from the rubber components of each sidewall of said tire; and cutting the tire into at least one linear length prior to stressing said wire belt layer (4, 5), said linear length having a natural curved cross-sectional shape with an inner and outer surface and with said liner (1) defining the inside surface thereof.

8. The method of claim 7 wherein:

said wire belt layer (4, 5) is stressed by orienting said linear length into an unnatural curved cross-sectional shape with said liner (1) defining the outside surface thereof.

9. The method of claim 8 wherein:

said wire belt layer (4, 5) is stressed by feeding said linear length through a concave-convex roller pair so as to orient said linear length into said unnatural shape.

10. The method of claim 8, further comprising the step of:

softening said liner (1) and rubber components in which said steel belt layer (4, 5) is embedded to cause weakening thereof, prior to applying said high pressure fluid.

11. The method of either claim 4 or claim 9 wherein:

said high pressure fluid is steam.

12. The method of claim 11 wherein:

said high pressure fluid is applied at a pressure of between about 50,000 and 55,000 psi.

13. The method of claim 12 further comprising the step of:

applying said high pressure fluid to said rubber components, after separation of said steel components therefrom, to produce rubber crumbs and/or rubber chunks.

14. An apparatus for separating steel components from rubber components in a tire, said steel components being embedded in said rubber components, said apparatus comprising:

means for positioning at least a part of the tire in a position for separation of said steel components from said rubber components, including means for orienting said tire to place said steel components under a stress which, in turn, biases said steel components in a direction urging them out of their embedment in said rubber components; and means for applying a high pressure fluid to said rubber components in said part of said tire in areas where said steel components are embedded to remove said rubber components from said steel components.

15. The apparatus of claim 14 wherein:

said means for positioning said tire to place said steel components under stress includes a pair of pincers to evert said tire.

16. The apparatus of claim 14 wherein:

said means for positioning said tire to place said steel components under stress includes;

a cutter for cutting the tire into a linear length having a natural curved cross-sectional shape with an inner surface which is concave and an outer surface which is convex; and a concave-convex roller pair for engaging opposite surfaces of said linear length to orient said linear length into an unnatural curved cross-sectional shape with said inner surface being convex and said outer surface being concave.

\* \* \* \* \*